United States Patent [19]

Takeda et al.

[11] 3,979,656
[45] Sept. 7, 1976

[54] BATTERY CHARGING CIRCUIT

[75] Inventors: Shuji Takeda; Tsutomu Otake, both of Suwa, Japan

[73] Assignee: Kabushiki Kaisha Suwa Seikosha, Tokyo, Japan

[22] Filed: Dec. 26, 1974

[21] Appl. No.: 536,714

[30] Foreign Application Priority Data
Dec. 25, 1973 Japan.................................. 49-4004

[52] U.S. Cl. .................................. 320/2; 58/23 C; 320/39
[51] Int. Cl.² ........................ H02J 7/00; G04C 3/00
[58] Field of Search .......... 58/23 BA, 23 C; 320/39, 320/40, 2

[56] References Cited
UNITED STATES PATENTS
3,341,763  9/1967  Noddin ................................ 320/39
3,731,474  5/1973  Tsuruishi............................. 58/23 C Primary Examiner—J D Miller
Assistant Examiner—Robert J. Hickey
Attorney, Agent, or Firm—Blum, Moscovitz, Friedman & Kaplan

[57] ABSTRACT

A battery charging circuit for effecting efficient charging of a battery by a solar energy source is provided. A voltage detecting circuit is coupled in parallel with a battery for detecting each state of charge of same, the detecting circuit including a constant voltage element. Transistor by-pass circuitry includes first and second current path electrodes connected in parallel with the battery. The transistor by-pass circuitry further includes a third control electrode coupled to the detecting circuit, and in response to the state of charging of the battery detected thereby, respectively effects one of an increase and decrease in the current carried by said current path electrodes.

5 Claims, 5 Drawing Figures

BATTERY CHARGING CIRCUIT

BACKGROUND OF THE INVENTION

This invention is directed to a battery charging circuit wherein a solar energy source is utilized to charge same, and in particular to a circuit for detecting a charged condition of the battery in order to prevent overcharging of same.

In recent years, solar batteries have gained wide popularity in view of their reliability, longevity and low price. In view of the benefits obtained therefrom, such solar batteries have been utilized in unmanned relay stations, lighthouses, sea lighting buoyies and rain and water gauge telemetering equipment.

Similarly, for general consumer use, solar batteries have been utilized as the sole power source for portable radios, electronic timepieces and the like. Accordingly, the number of solar batteries in use has rapidly increased as the increase in uses therefor have been found.

Solar batteries generate electricity by irradiation of the sun's rays, thereby rendering it necessary to use same in combination with a secondary battery in order to continuously apply electric power to the load. The most frequent use of a secondary battery is a Ni-Cd Alkali storage battery since same is very endurable, particularly with respect to overcharging and excess discharging. Moreover, Ni-Cd Alkali storage batteries can be charged by a small amount of current.

In order to utilize the solar battery as a source of charging voltage and current, the amount of voltage and current is obtained by connecting a group of solar battery elements in series or in parallel as required. Thus, the current or voltage required is obtained by making the proper connections. Nevertheless, with Ni-Cd secondary batteries, two different types of batteries are available, open batteries and hermetically sealed batteries. As to the former, a charger is utilized because of the limited charging capability of the battery. This is particularly true since the charge must be instantaneously applied if the secondary battery is to be properly charged, since a charge is always needed. Accordingly, a charging circuit is used in connection with a dry battery and a storage battery of the hermetically sealed type.

However, conventional storage batteries cannot be sealed hermetically because oxygen is produced at the positive electrode and hydrogen at the negative electrode as the battery reaches a completely charged state. Nevertheless, if a means is provided for effecting oxygen consumption by reaction at either the negative electrode, or at an additional electrode, it is possible to stably charge a Ni-Cd battery of the hermetically sealed type. Nevertheless, even in such a battery construction, when the charging current is excessive and the battery is overcharged thereby, an inbalance between the oxygen generating process and the oxygen consuming process is effected, causing an excess generation of gas, and hence the risk of causing a gas compression explosion.

In view of the risks of explosion caused thereby, charging currents are usually limited to 0.1 C and less in order to maintain the balanced condition between generation and consumption of oxygen. Nevertheless, when a charging circuit maintains such a low charging current, a considerable amount of current is wasted when the solar source senses high intensity light. Additionally, an excessive amount of time is required to charge the secondary battery. Accordingly, a solar source charging circuit adapted to effect an immediate charging of a secondary battery and yet being adapted to avoid overcharging thereof is desired.

SUMMARY OF THE INVENTION

Generally speaking, in accordance with the invention, a battery charging circuit utilizing a solar energy source for charging a secondary battery is provided. A voltage detecting circuit is coupled in parallel with the battery for detecting the state of charge of the battery, the detecting circuit including a constant voltage element. A by-pass circuit includes first and second current path electrodes connected in parallel with the battery. The by-pass circuit further includes a third control electrode coupled to the detecting circuit, and in response to the state of charge of the battery detected thereby effects an increase or decrease in the current conducted by the current path electrodes.

Accordingly, it is an object of this invention to provide an improved charging circuit wherein a solar battery is utilized to effect rapid charging of a secondary battery.

Another object of this invention is to provide a solar energy source as a charging element in a secondary battery charging circuit wherein the charging current produced by the solar energy source is utilized in an efficient manner.

Still another object of this invention is to provide a reliable and simple secondary battery charging circuit utilizing a solar battery as an energy source.

Still other objects and advantages of the invention will in part be obvious and will in part be apparent from the specifications and drawings.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 1:
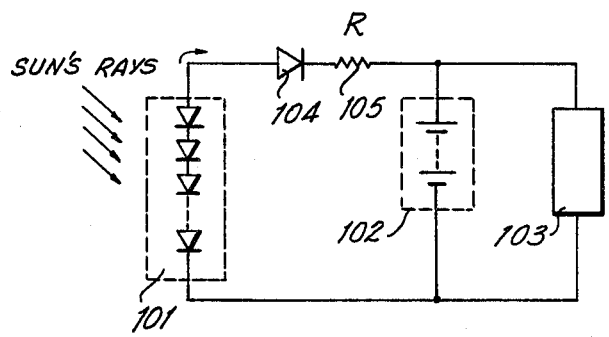
FIG. 1 is a circuit diagram of a secondary battery charging circuit utilizing a solar battery to effect charging.

Reference is now made to FIG. 1, wherein a charging circuit for a secondary battery wherein the current generated by the solar energy source is limited to protect the battery is depicted. A solar battery 101 is coupled through a diode 104 and impedance 105 to a Ni-Cd battery 102 adapted to charge a load 103. Diode 104 is utilized to prevent reverse currents from being applied to the solar battery when the Ni-Cd battery discharges. Resistor 105 is a limiting resistor for limiting the charging current applied to the secondary battery 102. As detailed above, a floating charge is utilized to maintain the oxygen generation and consumption in balance.

Figure 2:
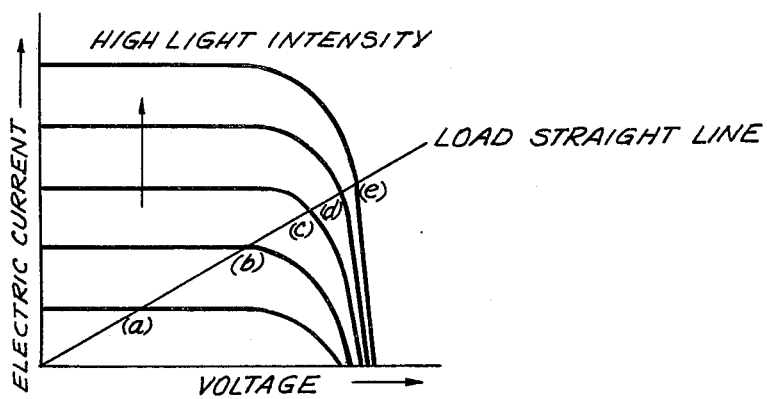
FIG. 2 is a graphical illustration of the light intensity dependence of a solar battery of the type utilized in the secondary battery charging circuit depicted in FIG. 1.

Reference is specifically made to FIG. 2 wherein a V-i characteristic as a function of light intensity and a load curve based on the impedance element 105 illustrates cross points (a) to (e) which represent the photocurrent produced by the solar battery source and the manner in which some increases in proportion to the light intensity. Nevertheless, as the light intensity increases, limiting impedance 105 holds down the increasing amount of current so that the amount of current seen by the secondary battery for charging increases only negligibly despite the large increase in current produced by the high intensity light applied to the solar battery source. A resistor 105 is selected to limit the current so that a saturation value of the photocurrent is on the order of 0.1 C of the secondary battery in order to guarantee the safe charging of a Ni-Cd battery in environmental conditions by a solar battery.

It is noted that when charging of a secondary battery by the circuit depicted in FIG. 1 occurs, the generating current is generally applied when the light intensity is low, and a large amount of current is wasted when the light intensity is high. Moreover, because the charging current is maintained at a low safe value, a considerable amount of time is required to effect charging of the battery. Moreover, because no charging current is produced during night conditions and further because rainy and cloudy days do not yield sufficient solar energy, the combination of a lack of sufficient current and the limited amount of current applied to prevent damage to the secondary battery results in a less than completely satisfactory charging of same.

Figure 3:
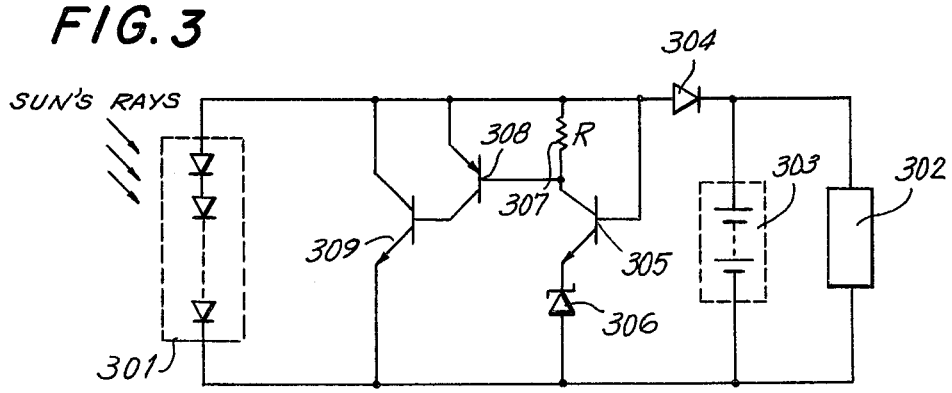
FIG. 3 is a circuit diagram of a battery charging circuit utilizing a solar battery source in accordance with a preferred embodiment of the instant invention.

Reference is now made to FIG. 3 wherein a battery charging circuit utilizing a solar battery for effecting rapid and safe charging of a secondary battery is depicted. Solar battery 301 is coupled through a reverse current limiting resistor 304 to Ni-Cd battery 303, which battery is adapted to drive a load 302. A detecting transistor 305 is adapted to detect the voltage of the battery and in combination with a constant voltage element 306, such as a Zener diode, and a load resistance 307, apply a detecting signal to the base electrode of transistor 308. Transistor 308 amplifies the detecting signal and applies same to a by-pass transistor 309 defining a collector to emitter current path for conducting current in response to the detecting signal applied to the base electrode thereof.

As discussed below with respect to the operation of the circuit depicted in FIG. 3, the solar battery 301 effects a rapid charge of the Ni-Cd battery 303 without causing damage to the battery. However, it is first necessary to select the diode 306 to provide a constant voltage corresponding to the voltage representative of the state when the Ni-Cd battery is completely charged times the number of batteries plus the forward voltage of the reverse current diode.

Initially, when the sun's rays are irradiated on the solar battery when the second battery is not yet charged, charging current is applied to the battery 303 through diode 304. At that time, the anode potential of diode 304 references the base potential of the transistor 305 to a potential lower than the total voltage of the battery voltage and the constant forward voltage of diode 304. However, as the battery nears the state of being completely charged, current begins flowing into the base electrode of the transistor 305 causing a signal to be transmitted to the next stage of transistor 308 for amplification by same. Accordingly, transistor 308 applies a signal to the base electrode of by-pass transistor 309 to render the current path defined by the collector and emitter electrodes in a conductive state. Once the battery is completely charged, the charging current applied to the battery decreases, and a likewise increase in the current flowing into the by-pass circuit defined by the collector and emitter electrode of transistor 309 occurs. Accordingly, the generating current is respectively divided in inverse proportion with the value of the internal resistance of the battery and the forward resistance of the diode and the conductive resistance of the by-pass transistor. Accordingly, if a charging current of 0.1 C and less is utilized to charge a Ni-Cd battery to a peak voltage of 1.5 V at the end of charging, even if charging is continued for a long time thereafter, the charging voltage does not change. Moreover, by selecting the resistor 307 to limit the charging current at the maximum light intensity a 0.1 C current or less provides a safe and rapid secondary battery charging circuit.

Figure 4:
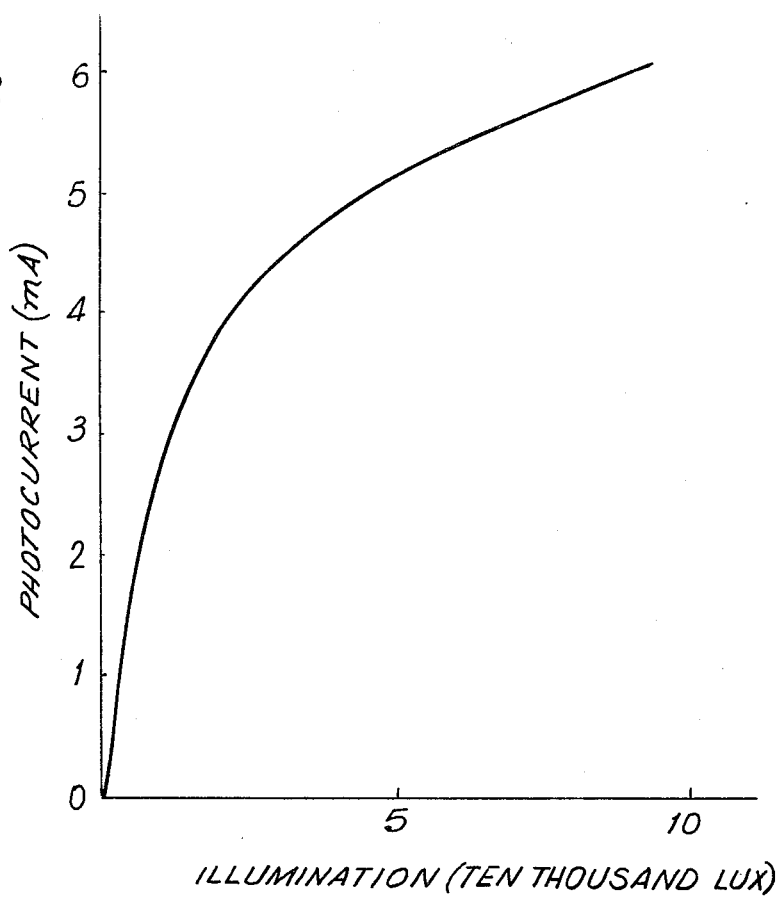
FIG. 4 is a graphical illustration of the photocurrent produced in response to the light intensity incident upon a solar battery in the circuit depicted in FIG. 3.
Figure 5:
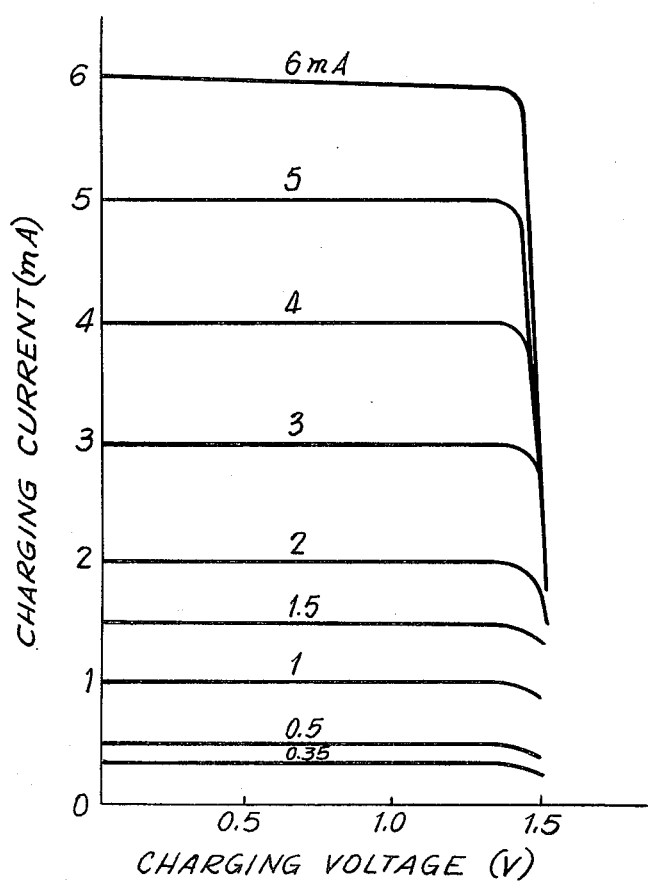
FIG. 5 is a graphical illustration of the light intensity dependence and change of charging current responsive to charging voltage achieved by the circuit embodiment depicted in FIG. 3.

Reference is made to FIGS. 4 and 5 wherein measurements are graphically illustrated of a secondary battery charging circuit utilizing a Ni-Cd battery with a capacity of 20mAH and four silicon diodes as the constant voltage element 306 depicted in FIG. 3. The photocurrent responsive to the illumination of the sun's rays is depicted in FIG. 4, and the change of charging current as charging voltage changes in response to the photocurrent is illustrated in FIG. 5 for the case where 0.1 C current corresponds to 2mA.

It is noted, that the use of a solar battery as a power source in a charging circuit will have many applications in view of the reduced cost at which solar batteries have become available. Specifically, electronic wristwatches utilizing quartz crystal oscillators as a time standard would be particularly suitable for use of a power source arrangement in accordance with the instant invention to replace the silver or mercury battery presently utilized therein.

Because the battery must be changed on the average of once a year, and furthermore in view of the inconvenience caused thereby, the replacement of a power source with a rechargeable circuit would provide an improved electronic wristwatch. Moreover, if a solar battery were utilized in a charging circuit in accordance with the instant invention in an electronic wristwatch, the only reduction in capacity of the Ni-Co battery would be the deterioration of same caused by aging. Moreover, the use of a small-sized rechargeable battery having a capacity of 20mAH can guarantee enough energy to keep a wristwatch running for several months without charging once the battery is charged to its peak value. Thus it is not necessary to continually charge the battery by exposing the wristwatch to sunlight as enough charge is provided to maintain the electronic timepiece running for several months.

It is further noted that a battery charging circuit in accordance with the instant invention can be miniaturized to be incorporated in a wristwatch and that same can be formed by integrated circuit MOS transistors having a low ON or conductive resistance. An example of a wristwatch utilizing a solar battery power source is the completely electronic wristwatch having an LED digital display sold in the United States by Ness Time.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. In a battery charging circuit having a solar energy source series-coupled to a secondary battery for applying a charging current thereto, the improvement comprising voltage detecting means coupled in parallel with said battery for detecting the state of charge of same, said detecting means including a constant voltage element and a detecting transistor including a control electrode referenced to said secondary battery potential for detecting the state thereof, and first and second current path electrodes coupled in series with said constant voltage element, and by-pass means including a first control electrode coupled to the detecting means and second and third current path electrodes connected in parallel with said battery for defining a by-pass current path for said charging current applied to said battery to prevent same from being overcharged, said by-pass means in response to the state of charge of said battery as detected at said first control electrode from said voltage detecting means, preventing the conduction of current in the current path defined by the second and third electrodes until said battery is charged to a predetermined voltage determined by the constant voltage element and thereafter permitting conduction of current in the current path defined by said by-pass means second and third electrodes, whereby the battery is by-passed when fully charged.

2. A battery charging circuit as claimed in claim 1, wherein said detecting means further includes a limiting impedance, said first current path electrode being coupled through said constant voltage element to a reference potential and said second detecting transistor current path electrode being referenced through said limiting impedance to said solar energy source.

3. A battery charging circuit as claimed in claim 1 wherein by-pass means is a transistor circuit means.

4. A battery charging circuit as claimed in claim 3, and including a reverse current limiting diode coupled in series with the battery to be charged, the anode terminal of said diode being coupled to said detecting transistor control electrode.

5. A battery charging circuit as claimed in claim 1, wherein said constant voltage element is at least one diode.

* * * * *